US012578881B2

(12) United States Patent
Alam et al.

(10) Patent No.: US 12,578,881 B2
(45) Date of Patent: Mar. 17, 2026

(54) SYSTEMS AND METHODS FOR USING DISTRIBUTED MEMORY CONFIGURATION BITS IN ARTIFICIAL NEURAL NETWORKS

(71) Applicant: Everspin Technologies, Inc., Chandler, AZ (US)

(72) Inventors: Syed M. Alam, Austin, TX (US); Michael Sadd, Chandler, AZ (US); Jacob T. Williams, Austin, TX (US)

(73) Assignee: Everspin Technologies, Inc., Chandler, AZ (US)

( * ) Notice: Subject to any disclaimer, the term of this patent is extended or adjusted under 35 U.S.C. 154(b) by 38 days.

(21) Appl. No.: 18/590,543

(22) Filed: Feb. 28, 2024

(65) Prior Publication Data

US 2025/0068341 A1     Feb. 27, 2025

Related U.S. Application Data

(60) Provisional application No. 63/520,879, filed on Aug. 21, 2023.

(51) Int. Cl.
*G06F 3/06* (2006.01)

(52) U.S. Cl.
CPC .......... *G06F 3/0629* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 11,568,609 B1 * | 1/2023 | Liu | G06N 3/0464 |
| 2014/0177345 A1 * | 6/2014 | Yamazaki | G11C 11/4076 |
| | | | 365/189.03 |
| 2021/0312278 A1 * | 10/2021 | Kwon | G06N 3/082 |
| 2021/0397974 A1 * | 12/2021 | Hoang | G06N 3/063 |

OTHER PUBLICATIONS

Amirany Abdolah et al: "Nonvolatile Associative Memory Design Based on Spintronic Synapses and CNTFET Neurons", IEEE Transactions on Emerging Topics in Computing, IEEE, vol. 10, No. 1, Sep. 25, 2020 (Sep. 25, 2020), pp. 428-437.
Sun Yanan et al: "Cream: Computing in ReRAM-Assisted Energy-and Area-Efficient SRAM for Reliable Neural Network Acceleration", IEEE Transactions on Circuits and Systems I: Regular Papers, IEEE, US, vol. 70, No. 8, Aug. 1, 2023 (Aug. 1, 2023), pp. 3198-3211.

* cited by examiner

*Primary Examiner* — Edward J Dudek, Jr.
*Assistant Examiner* — Ralph A Verderamo, III
(74) *Attorney, Agent, or Firm* — Bookoff McAndrews, PLLC

(57) ABSTRACT

Systems and techniques include identifying a network layer for performing a memory operation, identifying a subset of a plurality of configuration bit clusters of a non-volatile distributed memory that are mapped to the identified network layer using a cluster mapping, in response to identifying the subset of the plurality of configuration bit clusters, activating the subset of the plurality of configuration bit clusters, loading network component data from the subset of the plurality of configuration bit clusters into a local buffer, and applying the network component data to the network layer for performing the memory operation.

20 Claims, 12 Drawing Sheets

800

300

800

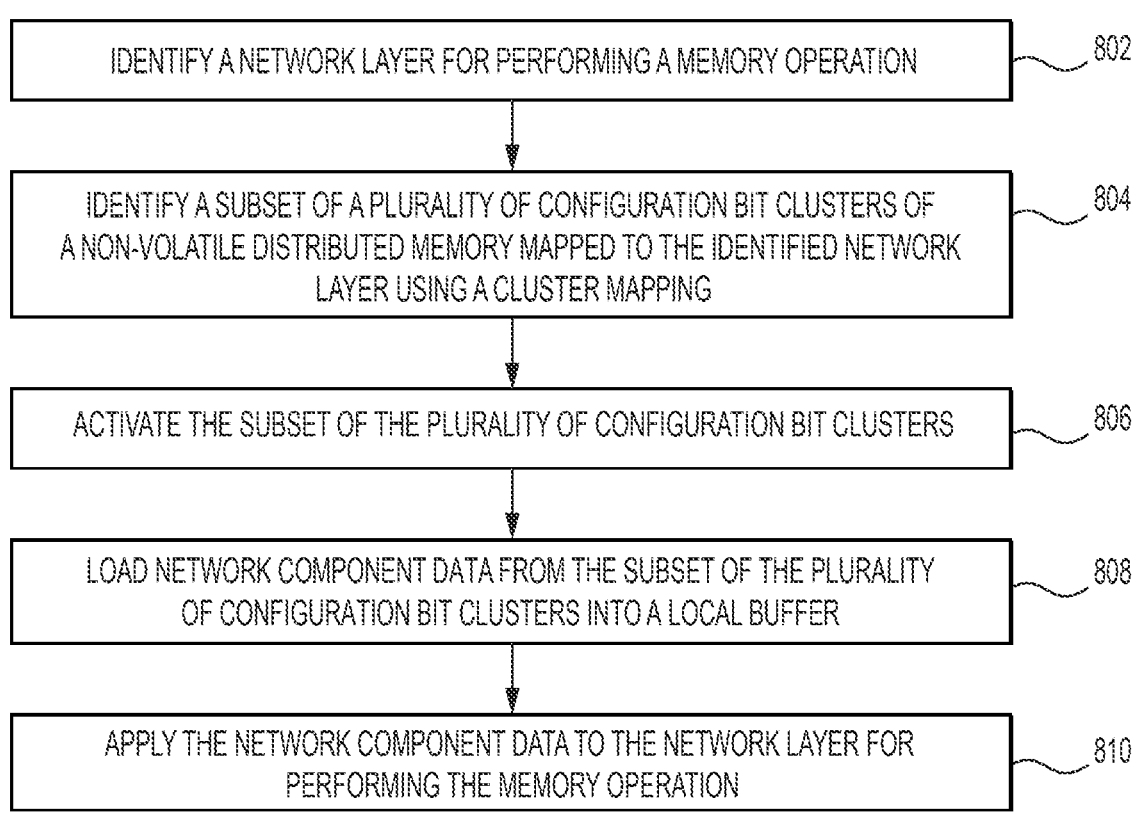

IDENTIFY A NETWORK LAYER FOR PERFORMING A MEMORY OPERATION    802

IDENTIFY A SUBSET OF A PLURALITY OF CONFIGURATION BIT CLUSTERS OF A NON-VOLATILE DISTRIBUTED MEMORY MAPPED TO THE IDENTIFIED NETWORK LAYER USING A CLUSTER MAPPING    804

ACTIVATE THE SUBSET OF THE PLURALITY OF CONFIGURATION BIT CLUSTERS    806

LOAD NETWORK COMPONENT DATA FROM THE SUBSET OF THE PLURALITY OF CONFIGURATION BIT CLUSTERS INTO A LOCAL BUFFER    808

APPLY THE NETWORK COMPONENT DATA TO THE NETWORK LAYER FOR PERFORMING THE MEMORY OPERATION    810

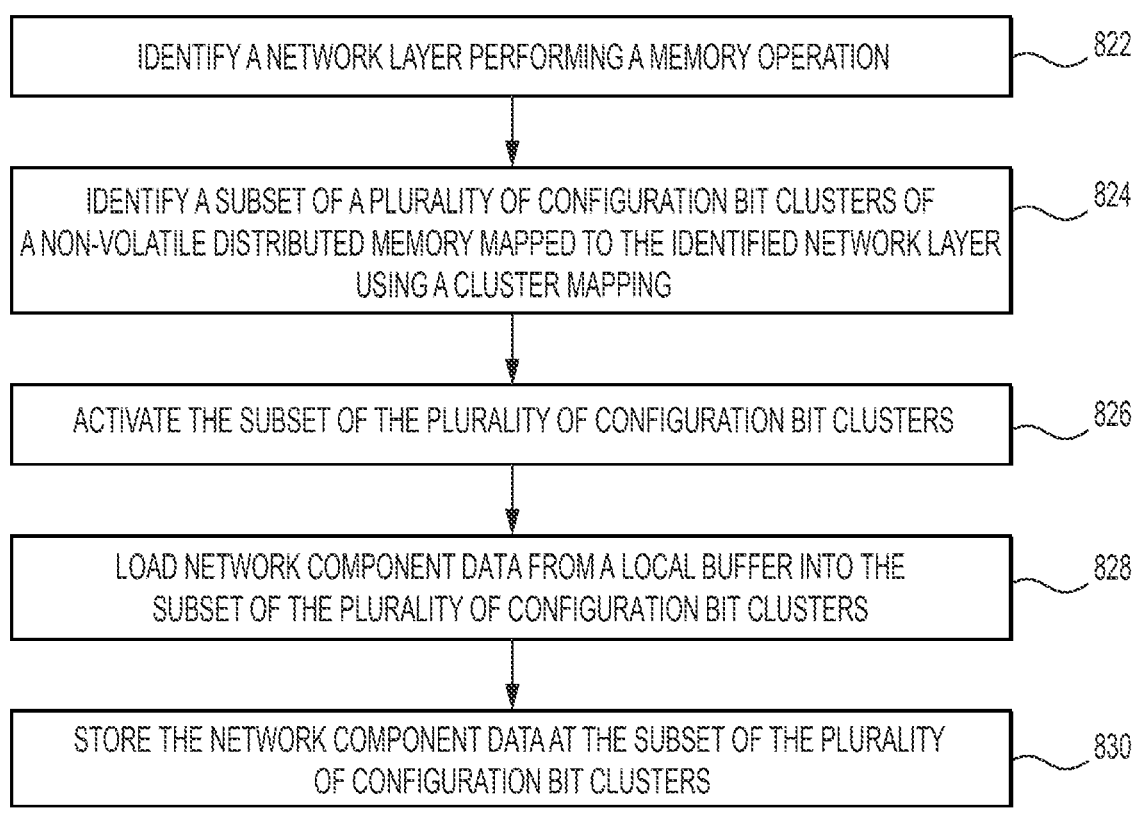

IDENTIFY A NETWORK LAYER PERFORMING A MEMORY OPERATION ⎯ 822

IDENTIFY A SUBSET OF A PLURALITY OF CONFIGURATION BIT CLUSTERS OF A NON-VOLATILE DISTRIBUTED MEMORY MAPPED TO THE IDENTIFIED NETWORK LAYER USING A CLUSTER MAPPING ⎯ 824

ACTIVATE THE SUBSET OF THE PLURALITY OF CONFIGURATION BIT CLUSTERS ⎯ 826

LOAD NETWORK COMPONENT DATA FROM A LOCAL BUFFER INTO THE SUBSET OF THE PLURALITY OF CONFIGURATION BIT CLUSTERS ⎯ 828

STORE THE NETWORK COMPONENT DATA AT THE SUBSET OF THE PLURALITY OF CONFIGURATION BIT CLUSTERS ⎯ 830

FIG. 8B

SYSTEMS AND METHODS FOR USING DISTRIBUTED MEMORY CONFIGURATION BITS IN ARTIFICIAL NEURAL NETWORKS

CROSS-REFERENCE TO RELATED APPLICATION

This application claims benefit to U.S. Provisional Patent Application No. 63/520,879, filed Aug. 21, 2023, the entire contents of which are incorporated herein by reference.

TECHNICAL FIELD

Embodiments of the present disclosure relate to, among other things, using configuration bit clusters in non-volatile distributed memory. More specifically, certain embodiments of the present disclosure relate to using configuration bit clusters in non-volatile distributed memory to load network component data from or into a local buffer.

INTRODUCTION

A network (e.g., artificial neural network) may include layers having hardware neurons. For some such layers and/or hardware neurons, associated weight values and bias values may require memory operations such as storage operations, retrieval operations, modification operations, read operations, and/or write operations. For example, in an inference application, weight values and bias values for each hardware neuron may be stored in memory off the chip. During use of the hardware neuron, the weight values and bias values may be loaded from the off-chip memory into on-chip random access memory (RAM) and/or registers where the network may be implemented. Off-chip memory access for weight values and bias values may add significant power consumption to the chip and/or increase latency in operations of the hardware neuron. Such memory access may also require implementing an undesirable amount of stand-by voltage.

SUMMARY

Various aspects discussed herein may include a method comprising: identifying a network layer for performing a memory operation; identifying a subset of a plurality of configuration bit clusters of a non-volatile distributed memory that are mapped to the identified network layer using a cluster mapping; in response to identifying the subset of the plurality of configuration bit clusters, activating the subset of the plurality of configuration bit clusters; loading network component data from the subset of the plurality of configuration bit clusters into a local buffer; and applying the network component data to the network layer for performing the memory operation.

Various aspects discussed herein may include a method comprising: identifying a network layer performing a memory operation; identifying a subset of a plurality of configuration bit clusters of a non-volatile distributed memory that are mapped to the identified network layer using a cluster mapping; in response to identifying the subset of the plurality of configuration bit clusters, activating the subset of the plurality of configuration bit clusters; loading network component data from a local buffer into the subset of the plurality of configuration bit clusters; and storing the network component data at the subset of the plurality of configuration bit clusters.

Various aspects discussed herein may include a system including a network comprising a plurality of network layers including a first layer identified for performing a memory operation; a local buffer in communication with a cluster mapping; and a non-volatile distributed memory comprising a plurality of configuration bit clusters, wherein the local buffer: activates a subset of the plurality of configuration bit clusters based on the cluster mapping; receives network component data from the subset of the plurality of configuration bit clusters; and provides the network component data to the first layer identified for performing the memory operation.

BRIEF DESCRIPTION OF THE DRAWINGS

In the course of the detailed description that follows, reference will be made to the appended drawings. The drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein; however, all permutations and combinations are considered to fall within the scope of the present inventions.

FIG. 8A depicts a flowchart for an exemplary method for performing a read operation using a non-volatile distributed memory and a local buffer memory, according to an aspect of the present disclosure.

FIG. 8B depicts a flowchart for an exemplary method for performing a write operation using a non-volatile distributed memory and a local buffer memory, according to an aspect of the present disclosure.

Figure 1:
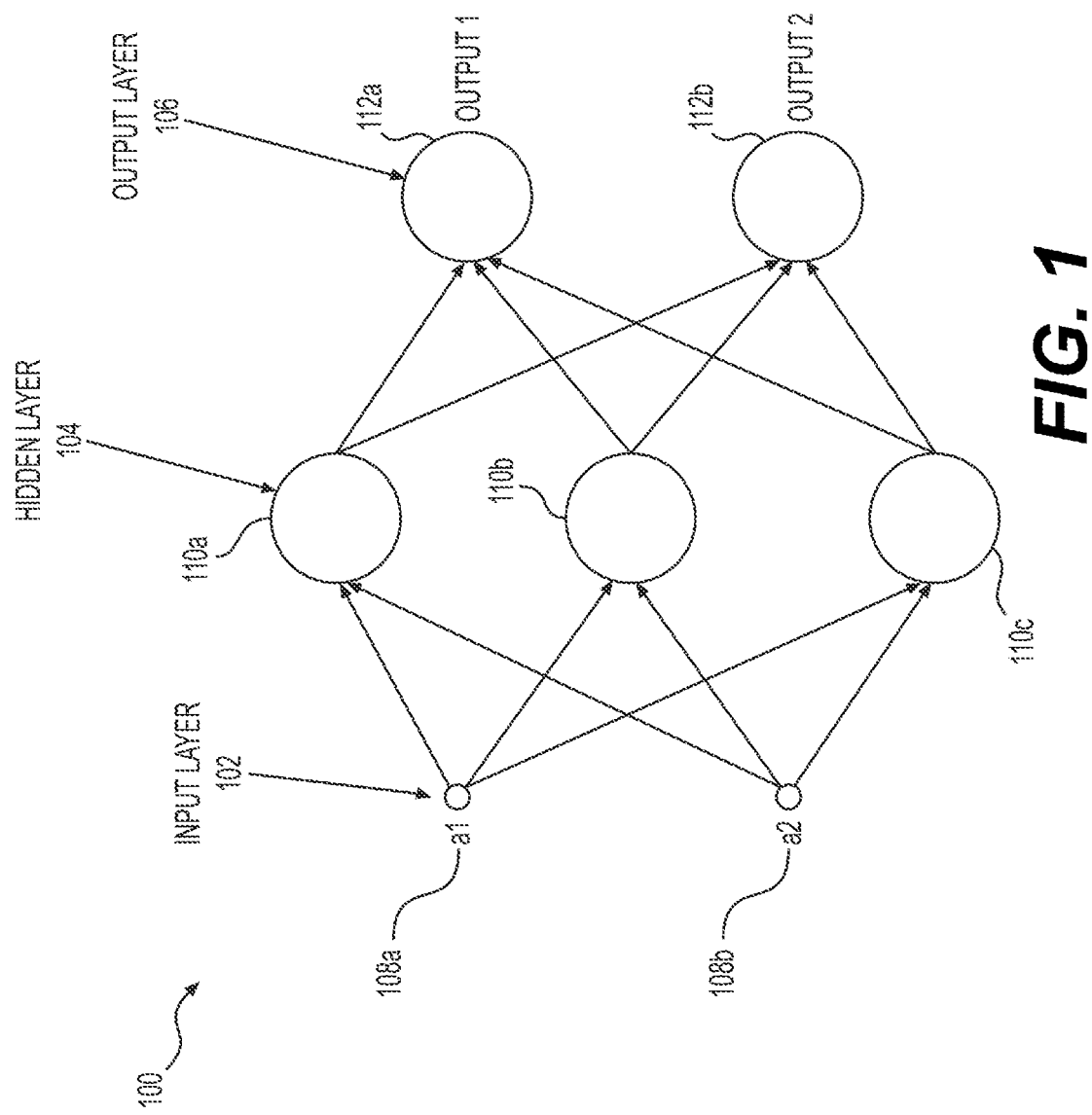
FIG. 1 depicts a functional diagram of an exemplary artificial neural network, according to an exemplary embodiment of the present disclosure.

There are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

DETAILED DESCRIPTION

Detailed illustrative aspects are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of exemplary embodiments described herein.

When the specification makes reference to "one embodiment" or to "an embodiment," it is intended to mean that a particular feature, structure, characteristic, or function described in connection with the embodiment being discussed is included in at least one contemplated embodiment of the present disclosure. Thus, the appearance of the phrases, "in one embodiment" or "in an embodiment," in different places in the specification does not constitute a plurality of references to a single embodiment of the present disclosure.

As used herein, the singular forms "a," "an," and "the" are intended to include the plural forms as well, unless the context clearly indicates otherwise. It also should be noted that in some alternative implementations, the features and/or steps described may occur out of the order depicted in the figures or discussed herein. For example, two steps or figures shown in succession may instead be executed substantially concurrently or may sometimes be executed in the reverse order, depending upon the functionality/acts involved. In some aspects, one or more described features or steps may be omitted altogether, or may be performed with an intermediate step therebetween, without departing from the scope of the embodiments described herein, depending upon the functionality/acts involved.

Further, the terms "first," "second," and the like, herein do not denote any order, quantity, or importance, but rather are used to distinguish one element from another. Similarly, terms of relative orientation, such as "top," "bottom," etc. are used with reference to the orientation of the structure illustrated in the figures being described. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

In one aspect, the present disclosure is directed to techniques and implementations to program storage devices, including, e.g., non-volatile or "permanent" memory capable of maintaining data when a power supply is deactivated (e.g., magnetoresistive random-access memory (MRAMs), or ReRAMs). Though the description below makes reference to MRAMs, register memory, or ReRAMs memory device cell, the embodiments disclosed herein may be implemented in other memory devices including, but not limited to, electrically erasable programmable read-only memory (EEPROM), and/or ferroelectric random-access memory (FRAM).

Conventional techniques for network memory operations include storing network component data (e.g., weights, biases, etc.) associated with network layers, neurons, or arcs, in an off-chip non-volatile memory, such as NOR or NAND memory. Such conventional techniques may include an on-chip volatile memory implemented using static random-access memory (SRAM) or flip-flop or register file which requires a high standby current for operation. In accordance with such conventional techniques, network component data (e.g., weights, biases, etc.) associated with network layers is loaded from off-chip non-volatile memory, such as an external NOR (e.g., flash memory), to on-chip volatile memory. Such a load operation adds inefficiencies both in terms of the amount of time to perform the load operation and the power required to perform the loading operation.

For example, an artificial neural network may include an input layer, intermediate layers (e.g., hidden layers), and an output layer. The input layer may receive one or more inputs to the artificial neural network. The inputs provided via the input layer may be applied to one or more hidden intermediate layers comprising hardware neurons. The one or more hidden layers may be trained based on supervised, semi-supervised, or unsupervised machine learning. Each neuron may have multiple corresponding network component data (e.g., weights, biases, layers, etc.) stored in memory. During a training process (e.g., learning operation) to train the artificial neural network, such network component data associated with the one or more hardware neurons or layers may be accessed (e.g., read), modified, deleted, written, re-written, added, and/or the like. Accordingly, a large amount of memory access may be required during an artificial neural network training process. Additionally, during a production use (e.g., inference operation) of a trained artificial neural network, network component data neurons may be accessed, and/or applied, via respective memory access. Additionally, an artificial neural network may continue training during an inference operation (e.g., based on feedback). Accordingly, components of hardware neurons or layers may be modified, deleted, written, re-written and/or added during a production process. During an inference operation of artificial neural networks, multiple network components (e.g., weights or biases) of each neuron or layer may have to be loaded into a volatile memory. Conventionally, such loading is implemented by storing the weights or biases in off-chip NOR and/or NAND flash memory, as discussed above. Data from such flash memory is be loaded into distributed on-chip memory in communication with artificial neural network processors prior to performing the inference operations and provided to locally available volatile storage elements, such as SRAM, scan chain, or registers by the distributed on-chip memory. In such conventional approaches, additional power consumption and time elapsed during such moving of data and such use of storage elements may be undesirable.

The present disclosure relates to systems and methods for using configuration bit clusters of a non-volatile distributed memory. According to certain embodiments, artificial neural network component data (e.g., related to weight values, bias values, processing layers, etc.) may be stored using distributed MRAM configuration bits of a non-volatile distributed memory. The network component data may be associated with multiple network layers. For example, a first subset of the network component data may be stored in a first subset of configuration bit clusters and a second subset of the network component data may be stored in a second subset of configuration bit clusters. Subsets of such configuration bit clusters may each be mapped to one or more network layers (e.g., neural network layers). For example, the first subset of configuration bit clusters may map to a first network layer which is associated with the first subset of the network component data. Similarly, the second subset of configuration bit clusters may map to a second network layer which is associated with the second subset of the network component data. Such network component data may be stored at the one or more configuration bit clusters such that a single configuration cluster or multiple configuration bit clusters may be accessed to retrieve (e.g., read) and/or update (e.g., write) such network component data.

A given network layer (e.g., a neural network layer) may be identified for performing a memory operation (e.g., an inference-based operation, a learning-based operation, etc.). The identification may be based on an activation of the network layer (e.g., based on network layer components being powered, based on network layer configuration bits being powered, based on one or more signals being generated or received corresponding to the network layer, and/or the like). For example, a network layer may be identified for an inference memory operation or a learning memory operation. An "inference memory operation," as used herein, may correspond to an operation for using a trained neural network to, for example, generate an output or to perform additional or iterative training. Such an output may be generated based on one or more inputs as well as network component data (e.g., weight values, bias values, etc.) associated with one or more layers of the network.

An inference memory operation may require, for example, approximately 1000 read or write operations associated with the network component data discussed herein. According to an example, during an inference memory operation, a given network layer (e.g., of a neural network) may be identified for generating an output or for generating a component of an output (e.g., where such component may be used by one or more other network layers to generate an overall output). The given network layer may have corresponding network component data which may be generated during a learning memory operation, as further discussed herein. It will be understood that the corresponding network component data may be updated during an inference memory operation (e.g., during a continued or updated learning operation). Such corresponding network component data may be retrieved (e.g., read operation) or updated (e.g., write operation) based on the given network layer being activated or otherwise triggered for performing the inference memory operation.

Similarly, for example, a given network layer (e.g., a neural network layer) may be identified for a learning memory operation. A "learning memory operation," as used herein, may correspond to an operation for training a neural network to, for example, generate an output based on the training. Such an output may be generated based on one or more inputs as well as network component data (e.g., weight values, bias values, etc.). The network component data may be generated and/or updated during a learning operation. According to an example, a learning memory operation may require approximately 100,000 or more read or write operations associated with the network component data discussed herein. According to an example, during a learning memory operation, a given network layer (e.g., of a neural network) may be identified for training the given network layer based on one or more of a supervised learning, an unsupervised learning, a semi-supervised learning, or the like. The given network layer may have corresponding network component data which may be generated and/or updated based on the learning operation. Such corresponding network component data may be retrieved (e.g., read operation) or updated (e.g., write operation) based on the given network layer being activated or otherwise triggered for performing the learning memory operation.

The network component data corresponding to a given network layer may be stored in one or more configuration bit clusters of a non-volatile distributed memory, as discussed herein. The distributed non-volatile memory may store a plurality of configuration bit clusters such that each of a subset of such configuration bit clusters correspond to corresponding network layers (e.g., neural network layers). Accordingly, the non-volatile distributed memory may include multiple subsets of configuration bit clusters, where each subset includes one or more configuration bit clusters. Each subset of configuration bit clusters may be mapped to a corresponding network layer (e.g., corresponding neural network layer) based on a cluster mapping. The cluster mapping may identify which subset of the configuration bit clusters are associated with which corresponding network layer. The cluster mapping may be implemented using any applicable mapping technique such as, but not limited to, a mapping table, a pointer based system, a mapping database, and/or the like.

As discussed above, a network layer may be identified for performing a memory operation. The network layer may be implemented in or in communication with (e.g., may receive data from and/or may provide data to) a local buffer. The local buffer may be implemented as an on-chip local memory connected to digital or analog components. For example, the local buffer may be connected to a given network layer and/or may be connected to each network layer of a network (e.g., a neural network). The local buffer may be implemented as on-chip memory, volatile memory, SRAM, and/or the like. According to some embodiments, the local buffer may be located on the same chip or processing device as the network, the network layers, and/or the non-volatile distributed memory. According to other embodiments, the local buffer may be located on the same chip or processing device as the network and the network layers and the non-volatile distributed memory may also be located on the same chip or processing device. The local buffer may be in active electrical communication with, for example, one given network layer at a given time. It will be understood that one or more layers of a network may be implemented using digital or analog components in electrical communication with the local buffer. According to this example, memory operations for a first given network layer are performed in communication with the local buffer at a first time and memory operations for a second given network layer are performed in communication with the local buffer at a second time. The first time and second time may be different times, or may be same times. As further discussed herein, network component data from a subset of configuration bit clusters associated with a given network layer may be accessed by the local buffer to perform a read or write operation.

Upon identifying a network layer for performing a memory operation, the local memory may access the cluster mapping. The cluster mapping may be used to identify the subset of configuration bit clusters of non-volatile distributed memory that are mapped to the identified network layer. In response to identifying the subset of configuration bit clusters based on the cluster mapping, the local buffer or another component may cause the subset of configuration bit clusters to be activated. Such activation may include providing a minimum threshold voltage to the subset of configuration bit clusters, may include providing a minimum threshold voltage to read latch blocks associated with the subset of configuration bit clusters, may include providing a minimum threshold voltage to read select devices associated with the subset of configuration bit clusters, and/or the like.

Activating the subset of configuration bit clusters may result in reading network component data from the subset of configuration bit clusters of the non-volatile distributed memory into the local buffer. Alternatively, or in addition, such activation may result in writing new or updated network component data into the subset of configuration bit clusters of the non-volatile distributed memory from the local buffer. It will be understood that the non-volatile distributed memory may be designed to store a larger volume of network component data than the local buffer. For example, the non-volatile distributed memory may store network component data corresponding to multiple network layers whereas the local buffer may store network component data associated with any single network layer at a given time.

The non-volatile distributed memory may remain in a power-off state, other than when a given subset of configuration bit clusters is activated in accordance with the techniques disclosed herein. The subset of configuration bit clusters may be instantly (e.g., within under approximately 10 ns) powered-on to perform read and/or write operations. Such power on from a power off state may be instant as such subset of configuration bit clusters do not require standby power or related bias circuitry for activation. Further, activating only the subset of configuration bit clusters instead of the entire non-volatile distributed memory, as performed in accordance with conventional techniques, may reduce the amount of minimum threshold voltage applied for powering-on the subset of configuration bit clusters.

In response to activating the subset of configuration bit clusters, in accordance with a read operation, network component data from the subset of configuration bit clusters may be loaded onto the local buffer. Such network component data may be applied to (e.g., provide to) a corresponding network layer for performing a memory operation. For example, such network component data may be provided to digital or analog components in electrical communication with the local buffer, where the digital or analog components are configured to implement operations associated with a given network layer. Alternatively, in response to activating the subset of configuration bit clusters, in accordance with a write operation, network component data may be loaded from the local buffer to the subset of configuration bit clusters. Such network component data may be provided by a corresponding network layer in accordance with, for example, a training or re-training memory operation.

Accordingly, the network component data stored at configuration bit clusters of the non-volatile distributed memory may be accessed instantly upon powering-on the applicable subset of configuration bit clusters. Upon completion of a corresponding memory operation (e.g., upon loading the applicable network component data from a given subset of configuration bit clusters), the subset of configuration bit clusters that are activated may be powered-off (e.g., a voltage applied to activate subset of configuration bit clusters may be removed). Therefore, by using the non-volatile distributed memory and by activating only applicable subsets of configuration bit clusters, power consumption may be reduced in comparison to conventional techniques. Further, as only the applicable subset of configuration bit clusters corresponding to a network layer are activated in non-volatile distributed memory, no standby voltage may be required for performing the memory operations disclosed herein. Accordingly, techniques disclosed herein may be used without expending a standby voltage and by expending limited resources by only activating applicable subsets of configuration bit clusters.

Therefore, one or more of the problems exhibited by conventional approaches may be solved by certain embodiments described herein. For example, power consumption, computational resources, and/or time may be reduced by using the non-volatile distributed memory (e.g., MRAM, register based memory, etc.) and local buffer architecture disclosed herein. Certain embodiments disclosed herein may mitigate power consumption, computational resources, and/or latency by providing on-chip access (e.g., instead of off-chip access) to network component data (e.g., weight values, bias values, processing layer information, etc.). In addition, by having on-chip access, certain embodiments may reduce the amount of routing needed to provide values from the non-volatile distributed memory to network processing circuitry, which may conserve chip space, reduce or eliminate circuitry from the artificial neural network, etc.

With reference now to FIG. 1, there is depicted a functional diagram of an exemplary artificial neural network 100, according to an exemplary embodiment of the present disclosure. As illustrated, the artificial neural network 100 may include an input layer 102, one or more hidden layers (hidden layer 104), and an output layer 106. The input layer 102 may provide input values 108a and 108b to the hidden layer 104, which may process the input values 108a (a1) and 108b (a2). The hidden layer 104 may include one or more hardware neurons 110 (also referred to herein as neuron devices) for performing the processing by using network component data. The hidden layer 104 may provide a result of the processing to the output layer 106 (e.g., to hardware neurons 112a and 112b of the output layer 106) for output to a device or user, for further processing, and/or the like, as depicted by "OUTPUT 1" and "OUTPUT 2."

As described in more detail herein, network component data (e.g., weight values, bias values, etc.) may be stored in non-volatile distributed memory and may be used during operations of the artificial neural network 100. For example, weight values may be associated with each arc (or synapse) between the input layer 102 and the hidden layer 104 and between the hidden layer 104 and the output layer 106. The arcs are illustrated in FIG. 1 as arrows between those layers. Additionally, or alternatively, bias values may be associated with each hardware neuron 110*a*, 110*b*, 110*c*, 112*a*, and 112*b* in the artificial neural network 100. As discussed herein, subset of configuration bit clusters at the non-volatile distributed memory may store such network component data for each respective arc, neuron, and/or layer.

Although certain embodiments may be described herein in the context of an artificial neural network 100, certain embodiments may be applicable to feedforward neural networks, radial basis function neural networks, Kohonen self-organizing neural networks, recurrent neural networks (RNNs), convolutional neural networks (CNNs), modular neural networks (MNNs), and/or the like.

Figure 2:
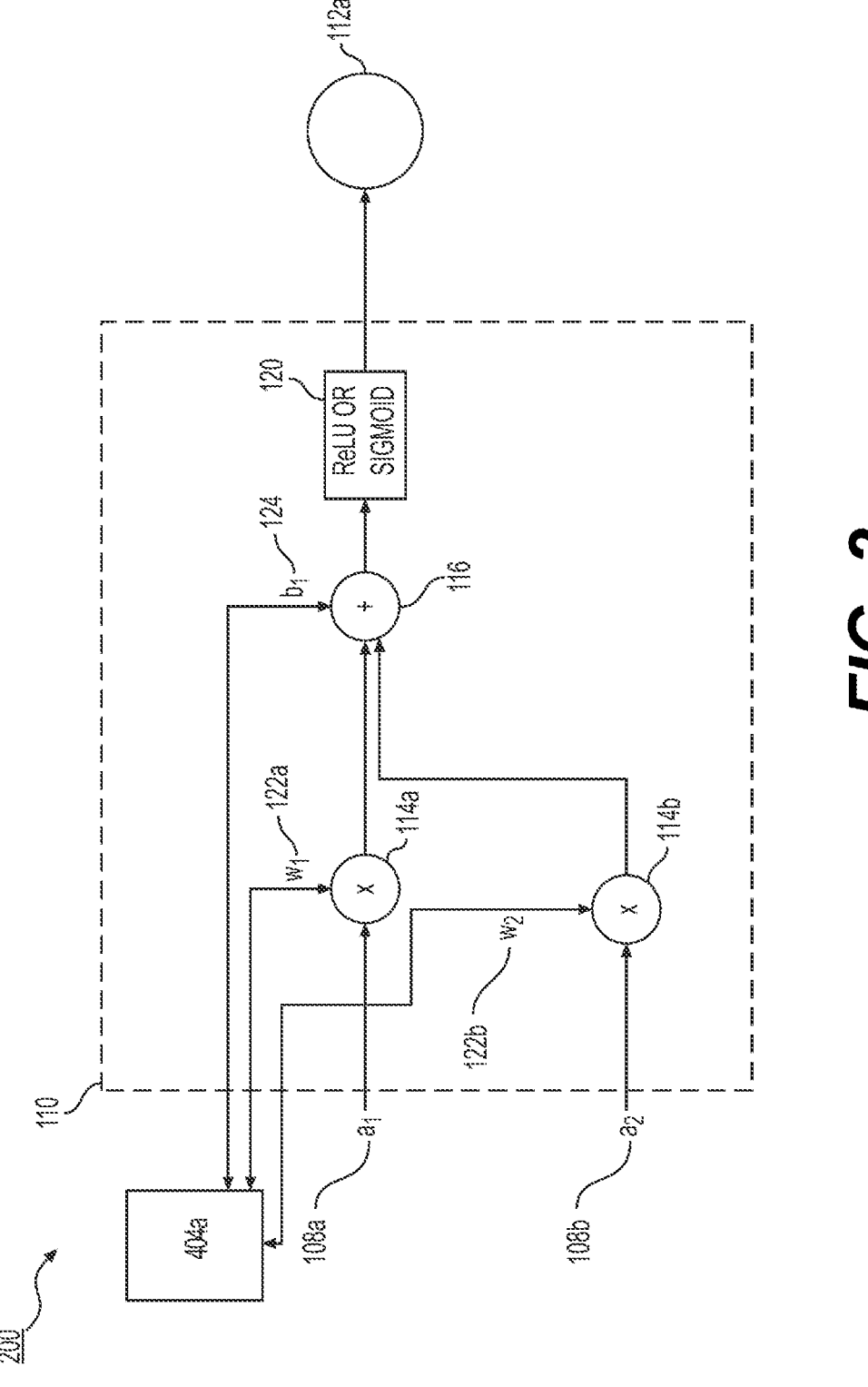
FIG. 2 depicts an example of a hardware neuron of the artificial neural network of FIG. 1, according to an exemplary embodiment of the present disclosure.

FIG. 2 depicts an example diagram 200 of a hardware neuron 110 of the artificial neural network 100 of FIG. 1, according to an exemplary embodiment of the present disclosure. As illustrated, the hardware neuron 110 of FIG. 2 may include weight operation circuitry 114*a*, 114*b*, bias operation circuitry 116, and activation function circuitry 120, which may implement a rectified linear unit (ReLU) activation function or a sigmoid activation function. Hardware neuron 110 may be a part of a given neural network layer of artificial neural network 100. Hardware neuron may be implemented via digital or analog compute module 404*b*, as further disclosed herein in reference to FIG. 4. Hardware neuron 110 may communicate with local buffer 404*a* (e.g., hardware neuron 110 may receive or provide network component data from or to local buffer 404*a*). Local buffer 404*a* is further described herein in reference to FIG. 4. For example, hardware neuron 110 may receive network component data such as weight value 122*a*, weight value 122*b*, and/or bias value 124 from local buffer 404*a*. Hardware neuron 110 may apply input values 108*a* and/or 108*b* to the operation circuitry 114*a*, 114*b*, and/or bias operation circuitry 116 (e.g., of digital or analog compute module 404*b*) to perform operations by applying the received network component data (e.g., weight value 122*a*, weight value 122*b*, and/or bias value 124). As a specific example, the weight operation circuitry 114 may multiply the input value 108*a* by the weight value 122*a* (e.g., $a_1 * W_1$). In certain embodiments, the weight values 122*a*, 122*b*, and/or bias value 124 may be updated based on, e.g., a feedback loop during training of the artificial neural network 100.

Local buffer 404*a* may be in electrical communication with multiple layers of artificial neural network 100 (e.g., multiple arcs, neurons, etc., of each layer of artificial neural network 100), which may be implemented using digital or analog compute 404*b* (e.g., as one given layer at a given time). As discussed herein, local buffer 404*a* may be in active electrical communication with a single layer of artificial neural network 100 at a given time, such that network component data for a given layer may be loaded at local buffer 404*a*, and such that memory operations for that given layer may be performed in communication with the local buffer 404*a*.

Figure 3:
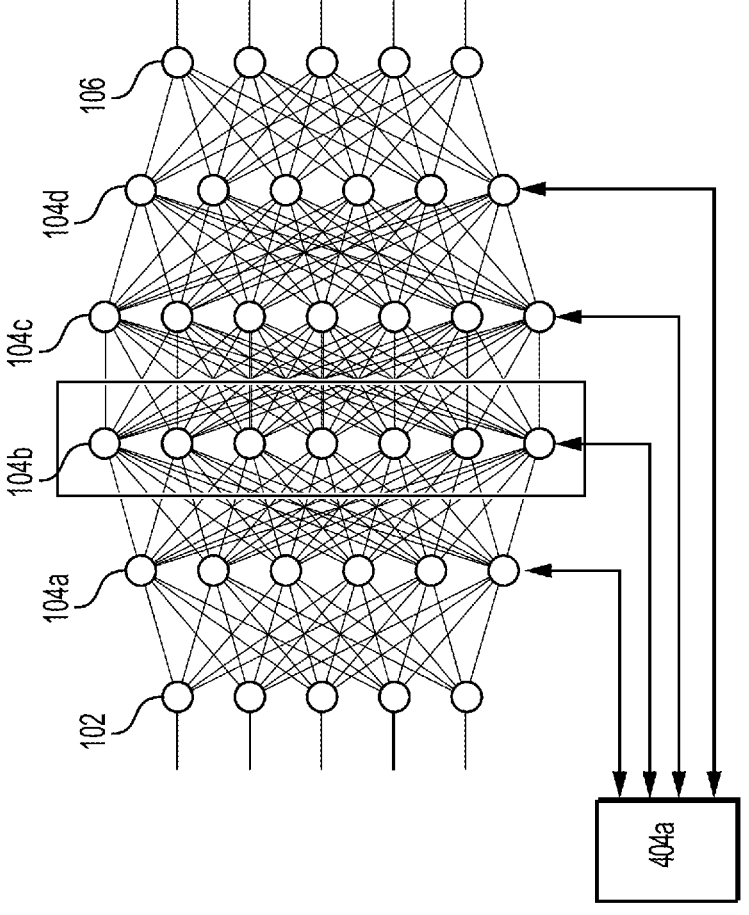
FIG. 3 depicts another functional diagram of the exemplary artificial neural network of FIG. 1, according to an exemplary embodiment of the present disclosure.

FIG. 3 depicts an expanded functional diagram 300 of the artificial neural network 100 of FIG. 1. As shown in FIG. 3, a plurality of hidden layers 104 of artificial neural network 100 are shown as hidden layer 104*a*, 104*b*, 104*c*, and 104*d*. Input layer 102 and output layer 106 of artificial neural network 100 are also depicted in FIG. 3. Additionally, FIG.

Figure 4:
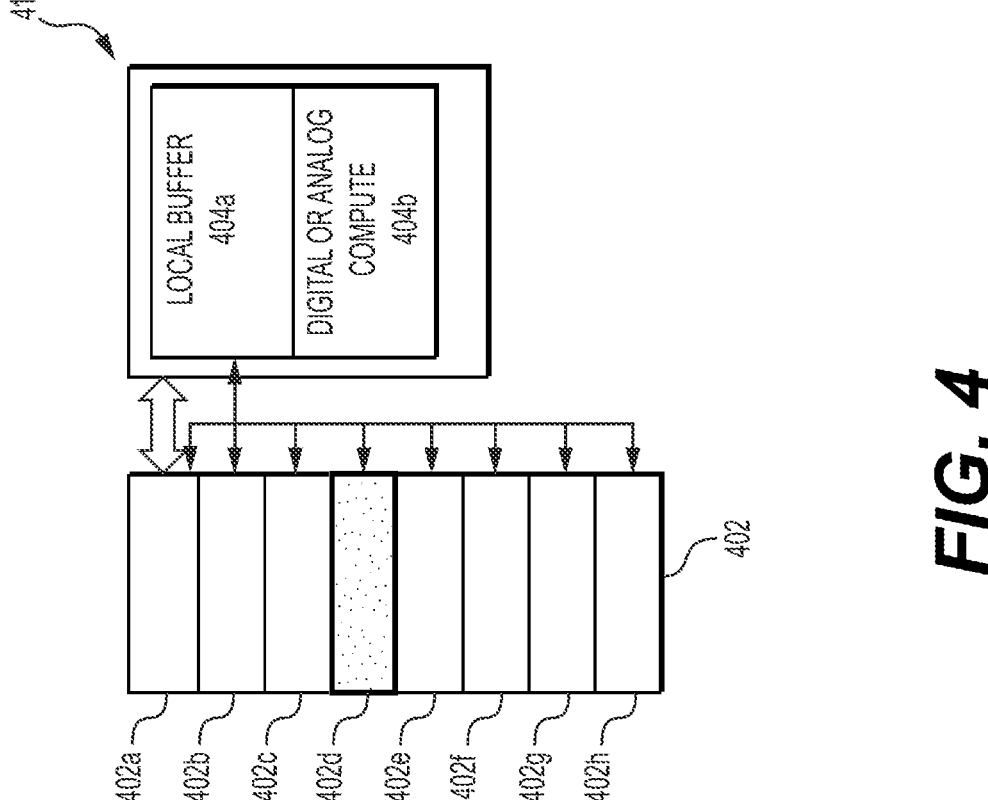
FIG. 4 depicts an exemplary embodiment of a non-volatile distributed memory and a local buffer memory, according to an exemplary embodiment of the present disclosure.

3 includes the local buffer 404*a* of FIG. 2 and FIG. 4. As shown, local buffer 404*a* is designed to functionally communicate with each of the plurality of hidden layers 104 (e.g., which may be implemented using digital or analog compute module 404*b*). As described herein, local buffer 404*a* may be designed to load network component data for a given layer performing a memory operation. As shown in FIG. 3, hidden layer 104*b* may be identified for performing a memory operation (e.g., an inference operation or a learning operation). Accordingly, local buffer 404*a* may receive network component data associated with hidden layer 104*b*, from a non-volatile distributed memory, based on a cluster mapping. The local buffer 404*a* may provide the received network component data mapped to hidden layer 104*b* and may communicate the received network component data to hidden layer 104*b* for performing the memory operation.

FIG. 4 depicts a functional diagram 400 including a non-volatile distributed memory 402 and a core 418. Core 418 may include local buffer 404*a* and digital or analog compute module 404*b* as also referenced with respect to FIGS. 2 and 3. Non-volatile distributed memory 402 may be located on the same chip as the core 418 or may be located off-chip from core 418. Non-volatile distributed memory 402's power supply may be shut down during an off (e.g., standby) state such that no power may be expended in such an off state. As discussed herein, non-volatile distributed memory 402 may be instantly activated (e.g., in under approximately 10 ns) to an on state. Non-volatile distributed memory 402's non-volatile properties may maintain data stored therein while non-volatile distributed memory 402 is in the off state.

Figure 5B:
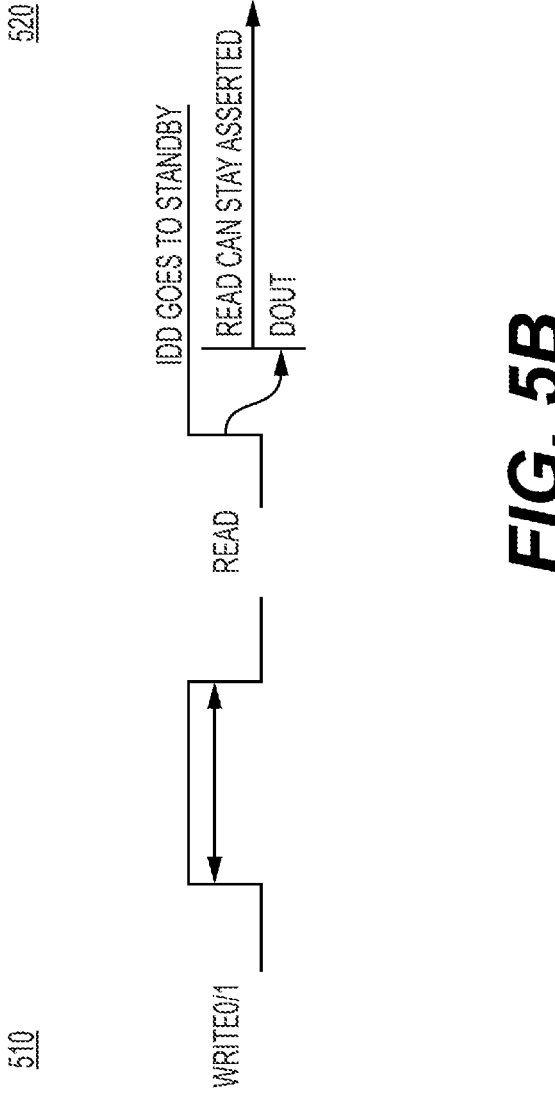
FIG. 5B depicts an exemplary embodiment for performing read and write operations for the configuration bit of FIG. 5A, according to an exemplary embodiment of the present disclosure.
Figure 5A:
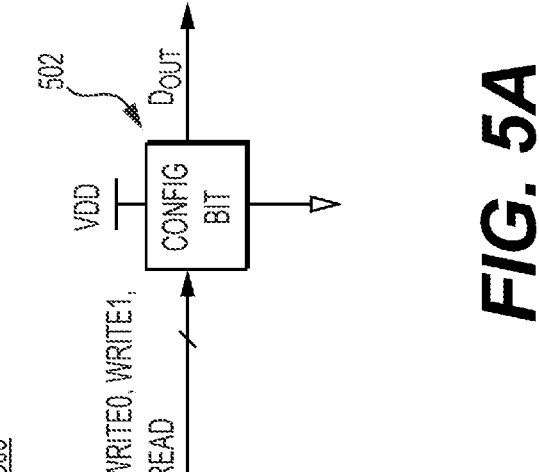
FIG. 5A depicts an exemplary embodiment of a configuration bit, according to an exemplary embodiment of the present disclosure.

Non-volatile distributed memory 402 may include a plurality of configuration bit clusters. Each configuration bit cluster may include one or more non-volatile configuration bits (e.g., implemented using MRAM, register memory, etc.). FIG. 5A depicts a diagram 500 of a single configuration bit 502 which may be implemented as non-volatile memory (e.g., as part of a configuration bit cluster of non-volatile distributed memory 402). Configuration bit 502 may be designed to receive digital inputs (e.g., read, write0, write1), perform a corresponding read or write operation, and may provide an output (e.g., data out for a read operation). As shown in FIG. 5A, configuration bit 502 may receive a digital read signal or write signal (e.g., write0 or write1). A VDD supply logic level voltage maybe supplied to configuration bit 502, which may be dynamically scaled to perform certain operations (e.g., write operations). Configuration bit 502 may transition from a powered off state to a power on state in under approximately 10 ns (e.g., under approximately 5 ns). FIG. 5B depicts a write operation 510 and read operation 520 corresponding to configuration bit 502 of FIG. 5A. As shown, a write operation 510 may be performed in response to a write operation input and may configure configuration bit 502 as having a true (e.g., 1) bit value in response to a write1 input or a false (e.g., 0) bit value in response to a write0 input. A read operation 520 may be performed in response to a read operation input and may generate a data out providing a current configuration of configuration bit 502 (e.g., a true or false configuration). The read operations may be performed in under approximately 10 ns (e.g., under approximately 5 ns). The write operation may be performed in approximately a time period needed to write the state (e.g. true or false) in the non-volatile storage element.

Figure 5C:
FIG. 5C depicts an exemplary embodiment of a configuration bit cluster, according to an exemplary embodiment of the present disclosure.

FIG. 5C depicts a cluster 540 of eight configuration bits. As shown in FIG. 5C, multiple configuration bits (e.g., multiple instances of configuration bit 502) may be grouped to create a cluster (e.g., cluster 540) of configuration bits. Each of the eight configuration bits in cluster 540 may be similar to configuration bit 502 of FIG. 5A. Accordingly, each of the eight configuration bits in cluster 540 may be designed to perform read and/or write operations in a manner described in reference to configuration bit 502. For example, each configuration bit of the eight configuration bits in cluster 540 may be designed to store a bit value (e.g., via a write operation) and/or to output a stored bit value (e.g., via a read operation). A given cluster (e.g., cluster 540) of configuration bits may be designed for an instant-on operation (e.g., ready for a read or write operation) via a supply voltage ramp that meets a minimum supply threshold. It will be understood that although cluster 540 includes eight configuration bits, any number of applicable configuration bits may be included in a given cluster. Further, non-volatile distributed memory 402 may include clusters having a different number of configuration bits. For example, a first cluster may include eight configuration bits whereas a second, different, cluster may include sixteen configuration bits (or any different number of configuration bits than the first cluster).

Returning to FIG. 4, non-volatile distributed memory 402 may include a plurality of clusters of configuration bits. As shown in FIG. 4, non-volatile distributed memory 402 may include configuration bit clusters 402a-402h. It will be understood that configuration bit clusters 402a-402h are shown as an example only, and that non-volatile distributed memory 402 may include any applicable number of clusters. Further, although configuration bit clusters 402a-402h are depicted as being similar in size, it will be understood that the clusters in non-volatile distributed memory 402 may have any applicable number of configuration bits (e.g., two or more configuration bits). As discussed herein, non-volatile distributed memory 402, including the clusters included therein and the configuration bits included within the clusters, may be implemented as non-volatile memory.

The configuration bit clusters 402a-402h may store network component data (e.g., weights, biases, etc.) associated with portions of a neural network. Although such portions of a neural network are generally referred to herein as a network layer, it will be understood that a subset of network may be a layer, an arc, a grouping, or the like associated with the neural network. A subset of configuration bit clusters may store network component data for a given subset of a neural network (e.g., a given layer), as discussed herein. Such network component data may be stored at a subset of configuration bit clusters such that the subset is formed from a single configuration bit cluster or multiple configuration bit clusters. Accordingly, a subset of configuration bit clusters mapped to a given network layer may include one cluster or multiple clusters within the non-volatile distributed memory 402. A given subset of configuration bit clusters (e.g., one given cluster or multiple given clusters) may be accessed to retrieve (e.g., read) and/or update (e.g., write) network component data associated with a corresponding network layer.

As also depicted in FIG. 4, core 418 may include a local buffer 404a and a digital or analog compute module 404b. The local buffer 404a may be a memory that is implemented as a volatile memory, as discussed herein. Digital or analog compute module 404b may include digital and/or analog system components designed to implement one or more network components such as a network layer, neuron, and/or the like. Local buffer 404a and/or digital or analog compute module 404b may access a cluster mapping (e.g., based on a network layer identified for performing a memory operation). Digital or analog compute module 404b may further receive network component data loaded (e.g., stored) at the local buffer memory 404a to implement an identified network layer (e.g., to perform a read operation) or may provide network component data to a corresponding subset of configuration bit clusters (e.g., to implement a write operation). Digital or analog compute module 404b may include network components such as circuitry which may allow digital or analog compute module 404b to act as or implement a network component (e.g., layer, neuron, etc.). Digital or analog compute module 404b may, for example, act as or implement a currently active network layer (e.g., active hidden layer 104b of FIG. 3).

In reference to FIGS. 3 and 4, hidden network layer 104b may be identified for performing a memory operation (e.g., an inference operation, a learning operation, etc.). Hidden network layer 104b may be identified based on a trigger action corresponding to hidden network layer 104b. The trigger action may be, for example, an input received at hidden network layer 104b (e.g., from one or more other layers), an output requested from hidden network layer 104b (e.g., from one or more other layers), upon completion of a sequential or dynamic network process, and/or the like. Core 418 may receive an indication (e.g., a signal) corresponding to the identification of hidden network layer 104b. The indication may be received from hidden network layer 104b, one or more other hidden layers 104, or other component associated with artificial neural network 100.

In response to receiving the indication corresponding to the identification of hidden network layer 104b, core 418 (e.g., via local buffer 404a and/or digital or analog compute module 404b) may access a cluster mapping (e.g., mapping table, pointer based system, mapping database, etc.). Core 418 may access the cluster mapping to identify the subset of configuration bit clusters of non-volatile distributed memory 402 that correspond to the identified hidden network layer 104b. For example, as shown in FIG. 4, the cluster mapping may identify a subset of configuration bit clusters represented by cluster 402d. As discussed, the subset of configuration bit clusters may be a single cluster or a group of clusters associated with network component data associated with a given layer (e.g., hidden network layer 104b).

In response to identifying the subset of configuration bit clusters, the identified subset of configuration bit clusters may be activated. The identified subset of configuration bit clusters may be activated in response to applying a minimum threshold voltage (e.g., a VDD mean voltage) to the subset of the plurality of configuration bit clusters. The minimum threshold voltage may be provided by or may be caused to be provided by core 418.

According to an embodiment, the non-volatile distributed memory 402 of FIG. 4 may be implemented using read latch blocks associated with each configuration bit and/or each cluster of configuration bits. A read latch block may be designed to read and store configuration bit states (e.g., for a single configuration bit or a cluster of configuration bits). According to this embodiment, a minimum threshold voltage may be applied to a write component and/or read latch blocks associated with the clusters. Each configuration bit or each cluster of configuration bits may be associated with a corresponding read latch block. The read latch block may be designed to read one or more states of the given configuration bit and/or cluster of configuration bits and may further be configured to communicate with core 418 to receive and/or provide the one or more states. For example, as discussed in reference to FIGS. 5A and 5B herein, a read or write operation may be triggered by applying a minimum threshold voltage to configuration bit 502. Configuration bit 502 may be activated instantly (e.g., in under approximately 10 ns) to perform a read or write operation. As shown in FIG. 5B, read operation 520 may be implemented by a read latch block associated with a configuration bit or a cluster of configuration bits. The read latch block may provide the "dout" output corresponding to the configuration bit or each configuration bit in a cluster of configuration bits.

A minimum threshold voltage may be applied in response to an indication (e.g., a signal) generated at core 418, which may be triggered by local buffer 404a and/or digital or analog compute module 404b. As discussed herein, the identified subset of configuration bit clusters may be in an off state (e.g., having no standby power) prior to activation. The identified subset of configuration bit clusters may be activated from the off state to an on state in under approximately 10 ns (e.g., in under approximately 5 ns). As the configuration bit clusters discussed herein are implemented as non-volatile (e.g., MRAM, register, etc.) memory, such clusters may not require a standby current to store network component data. As such clusters may activate from an off state to an on state in approximately under 10 ns, no standby current may be required to meet minimum times associated with storing network component data and read or write operations of network component data.

Upon activation of the identified subset of configuration bit clusters, network component data may be loaded (e.g., read) from the identified subset of configuration bit clusters into the local buffer 404a of core 418. Such loaded network component data may be provided to the corresponding network layer for network operations. Alternatively, network component data (e.g., updates to existing network component data) may be received from a corresponding network layer during network operations. Upon activation of the identified subset of configuration bit clusters, network component data may be written from the local buffer 404a of core 418 into the identified subset of configuration bit clusters. Upon loading network component data and/or writing network component data, the identified subset of configuration bit clusters may be deactivated. The identified subset of configuration bit clusters may be deactivated such that power (e.g., minimum threshold voltage) provided to the identified subset of configuration bit clusters may be removed. Accordingly, the identified subset of configuration bit cluster and, by extension, the non-volatile distributed memory 402 may return to an off state such that no power consumption is exhibited until a subsequent load or write operation is performed.

Accordingly, techniques disclosed herein may be used to read data from the identified subset of configuration bit clusters or write data to the identified subset of configuration bit clusters. Such read and write operations may facilitate memory operations (e.g., inference operations, learning operations, etc.) associated with a corresponding network layer. As discussed herein, the non-volatile distributed memory and local buffer may allow such read and write operations to be triggered instantly (e.g., within approximately 10 ns). Such instant triggering may be facilitated by the configuration bit clusters of the non-volatile distributed memory, which may be powered on instantly (e.g., within under approximately 10 ns).

Additionally, the power consumption associated with the operations discussed herein may be substantially lower than the power consumption required with conventional techniques. For example, identifying and activating only a subset of configuration bit clusters, instead of an entire distributed memory (e.g., the entire non-volatile distributed memory 402), results in reduced power consumption. Further, as no standby voltage is required to provide standby power to the distributed memory, such standby voltage is not required for performing the operations disclosed herein.

It will be understood that the operations discussed above may be repeated for performing subsequent memory operations. For example, at a time subsequent to performing memory operations in association with hidden layer 104b, hidden layer 104c may be identified for performing a subsequent memory operation. As discussed herein, subsequent to performing memory operations in association with hidden layer 104b, the subset of configuration bit clusters associated with hidden layer 104b may be deactivated. A subsequent set of the plurality of configuration bit clusters (e.g., cluster 402b of FIG. 4) may be identified as mapped to hidden layer 104c, in accordance with the techniques disclosed herein. The subsequent set of the plurality of configuration bit clusters (e.g., cluster 402b of FIG. 4) may be activated and corresponding network component data may be loaded to or from the local buffer 404a of core 418. Corresponding memory operations may be performed in association with hidden layer 104c, as disclosed herein.

Figure 6A:
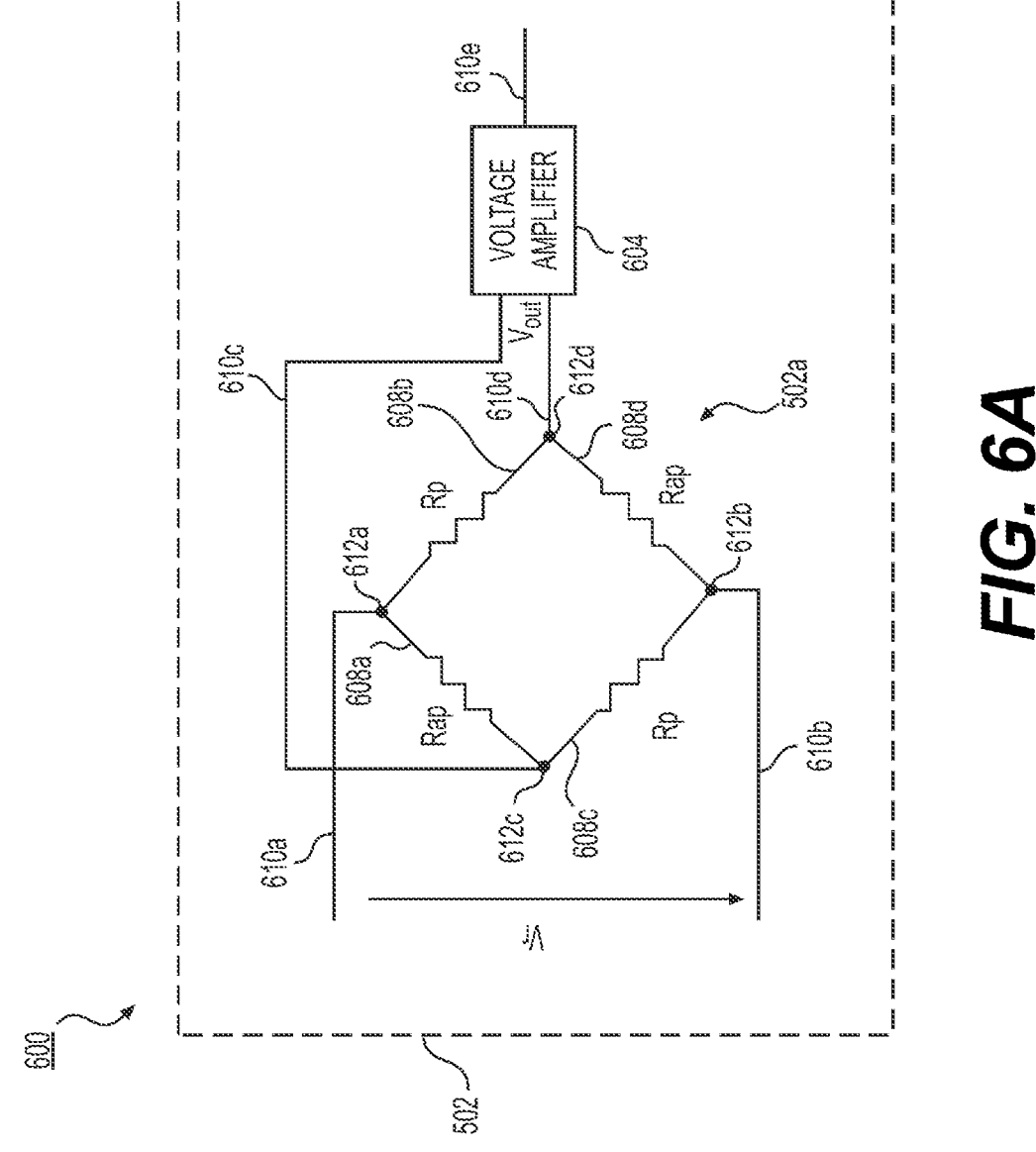
FIG. 6A depicts an exemplary embodiment of a configuration bit implemented as a magnetic tunnel junction (MTJ) bridge, according to an exemplary embodiment of the present disclosure.

FIG. 6A depicts a configuration 600 of exemplary configuration bit 502 as discussed in reference to FIG. 5A. For example, FIG. 6A depicts circuitry of a multi-time programmable configuration bit 502 configured for writing and for read-out of a first value or a second value, according to an exemplary embodiment of the disclosure. For example, configuration bit 502 may be an MRAM (e.g., toggle MRAM or spin-transfer torque (STT) MRAM) or a ReRAM bit that can be re-programmed multiple times to represent different values. The circuitry of the configuration bit 502 illustrated in FIG. 6A may allow writing of or reading out a first value (e.g., a 0 value of a binary 0 and 1 system) or a second value (e.g., a 1 value of the binary 0 and 1 system).

As illustrated, configuration bit 502 may be implemented using a magnetic tunnel junction (MTJ) bridge 502a. MTJ bridge 502a may be connected to or may include a voltage amplifier 604 and/or an inverter (not illustrated in FIG. 6A). The MTJ bridge 502a may include one or more resistive elements 608 (e.g., resistive elements 608a, 608b, 4608c, and 608d). Although FIG. 6A illustrates the MTJ bridge 502a as including four resistive elements 608, certain embodiments may include any number of multiple resistive elements 608 such as a number of resistive elements greater than four (e.g., 5, 6, 7, 8, etc. resistive elements). A resistive element 608 may include an MTJ or another type of electrical component capable of providing resistance to a flow of electrical current. For example, a resistive element 608 may have multiple resistance states (e.g., a low resistance state (parallel) or Rp, and a high resistance state (antiparallel) or Rap).

The MTJ bridge 502a may further include one or more electrodes 612 (e.g., electrodes 612a, 612b, 612c, and 612d) to electrically connect different resistive elements 608 in series or in parallel. For example, MTJ bridge 502a may include four resistive elements, where two first resistive elements are electrically connected in series and two second resistive elements are electrically connected in series and where the first resistive elements are electrically connected in parallel to the second resistive elements. As a specific example, the resistive elements 608a, 608b (forming a first group of resistive elements 608) may be electrically connected in series via the electrode 612a, the resistive elements 608c, 608d (forming a second group of resistive elements 608) may be electrically connected in series via the electrode

612*b*, and the first group and second group of resistive elements may be electrically connected in parallel via the electrodes 612*c*, 612*d*.

Configuration bit 502 may include one or more electrical connections 610 (e.g., electrical connections 610*a*, 610*b*, 610*c*, 610*d*, and 610*e*). The electrical connection 610*a* may electrically connect the electrode 612*a* to a voltage supply (not illustrated in FIG. 6A) and the electrical connection 610*b* may electrically connect the electrode 612*b* to the voltage supply. The electrical connection 610*c* may electrically connect the electrode 612*c* to an input of the voltage amplifier 604 and the electrical connection 610*d* may electrically connect the electrode 612*d* to the input of the voltage amplifier 604. The electrical connection 610*e* may electrically connect an output of the voltage amplifier to an inverter (not illustrated in FIG. 6A). The inverter may be in different states depending on whether the gate of the inverter is open or closed. The inverter may be in a first state (e.g., a 1 state) indicative of a first value (e.g., a 1 value) based on applied voltage to the MTJ bridge 502*a*.

As described above, the resistive elements 608 may have two resistance states (e.g., a high resistance state, Rap, and a low resistance state, Rp). For the first state of the inverter, the resistive elements 608*a*, 608*d* may be in the high resistance state and the resistive elements 608*b*, 608*c* may be in the low resistance state. For a second state of the inverter, the resistive elements 608*a*, 608*d* may be in the low resistance state and the resistive elements 608*b*, 608*c* may be in the high resistance state.

In some embodiments, the MTJ bridge 502*a* of configuration bit 502 illustrated in FIG. 6A may store one bit, and configuration bit 502 may be configured with multiple instances of the MTJ bridges 502*a* illustrated in FIG. 6A for multiple bits. The MTJ bridges 502*a* may be read, multi-time programmed (MTP), and/or one-time programmed (OTP).

Figure 6C:
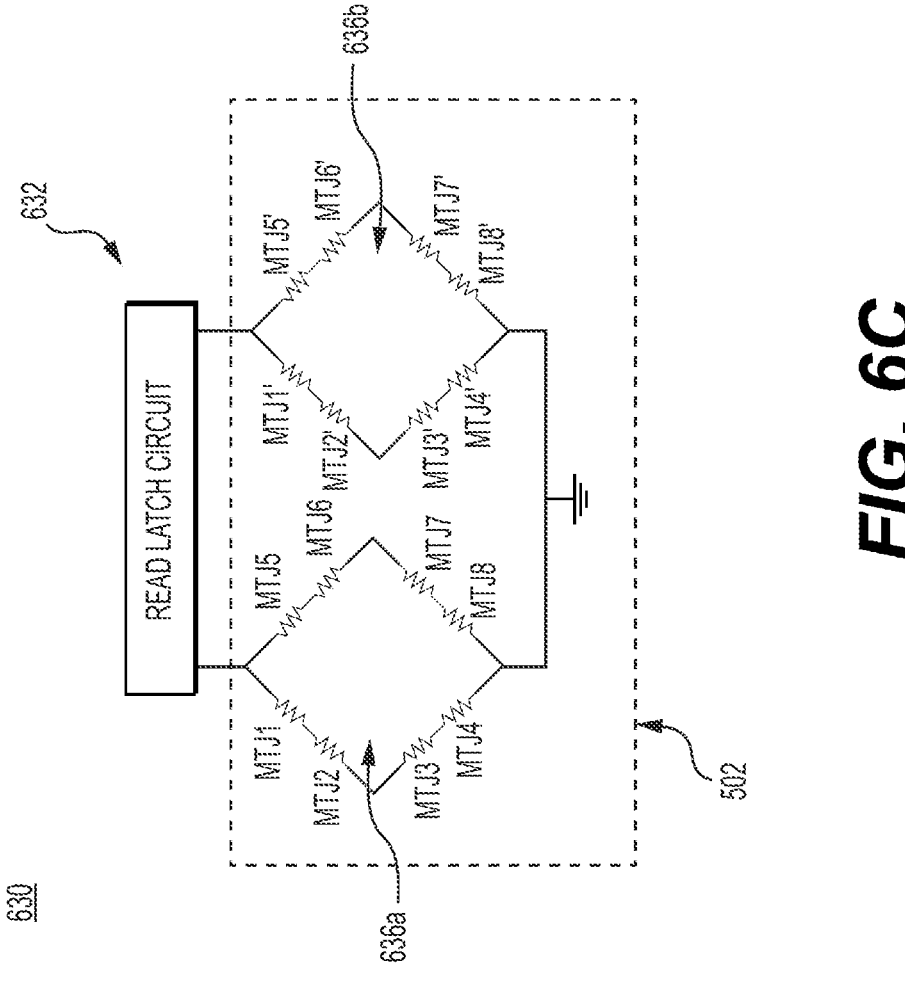
FIG. 6C depicts an exemplary embodiment of a configuration bit implemented using multiple MTJ bridges, according to an exemplary embodiment of the present disclosure.
Figure 6B:
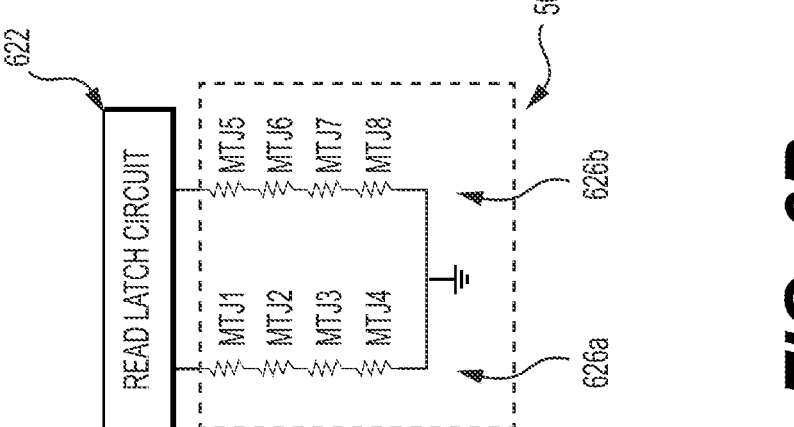
FIG. 6B depicts an exemplary embodiment of a configuration bit implemented as MTJ branches, according to an exemplary embodiment of the present disclosure.

FIG. 6B depicts another configuration 620 of exemplary configuration bit 502 as discussed in reference to FIG. 5A. As shown, in FIG. 6B, a dedicated read latch circuit 622 may be connected to configuration bit 502. Read latch circuit 622 may be connected to both a first branch 626*a* of multiple MTJs arranged in series (e.g., four MTJs) and a second branch 626*b* of multiple MTJs arranged in series. Read latch circuit 622 may be designed to read (e.g., sense) a resistance difference between the first branch 626*a* and second branch 626*b* of multiple MTJs arranged in series. The resistance difference may provide a read output corresponding to the state of configuration bit 502 (e.g., a true 1 or false 0).

FIG. 6C depicts another configuration 630 of exemplary configuration bit 502 as discussed in reference to FIG. 5A. As shown, in FIG. 6C, a dedicated read latch circuit 632 may be connected to configuration bit 502. Read latch circuit 632 may be connected to both a first MTJ bridge 636*a* of multiple MTJs arranged in series and parallel (e.g., eight MTJs) and a second bridge 636*b* of multiple MTJs arranged in series and parallel (e.g., as discussed in reference to FIG. 6A). Read latch circuit 632 may be designed to read (e.g., sense) a resistance difference between the first bridge 636*a* and second bridge 636*b*. The resistance difference may provide a read output corresponding to the state of configuration bit 502 (e.g., a true 1 or false 0).

Although configuration 620 of FIG. 6B and configuration 630 of FIG. 6C are generally discussed in reference to a read operation, it will be understood that the write operations may be implemented using the resistive circuits discussed in reference to these configurations. For example, the state of configuration bit 502 in the configuration 620 of FIG. 6B may be updated by modifying the resistance sates associated with the first branch 626*a* and/or second branch 626*b* and/or states associated with resistors (e.g., MTJs) included therein. Similarly, for example, the state of configuration bit 502 in the configuration 630 of FIG. 6C may be updated by modifying the resistance sates associated with the first bridge 636*a* and/or second bridge 636*b* and/or states associated with resistors (e.g., MTJs) included therein.

Figure 7:
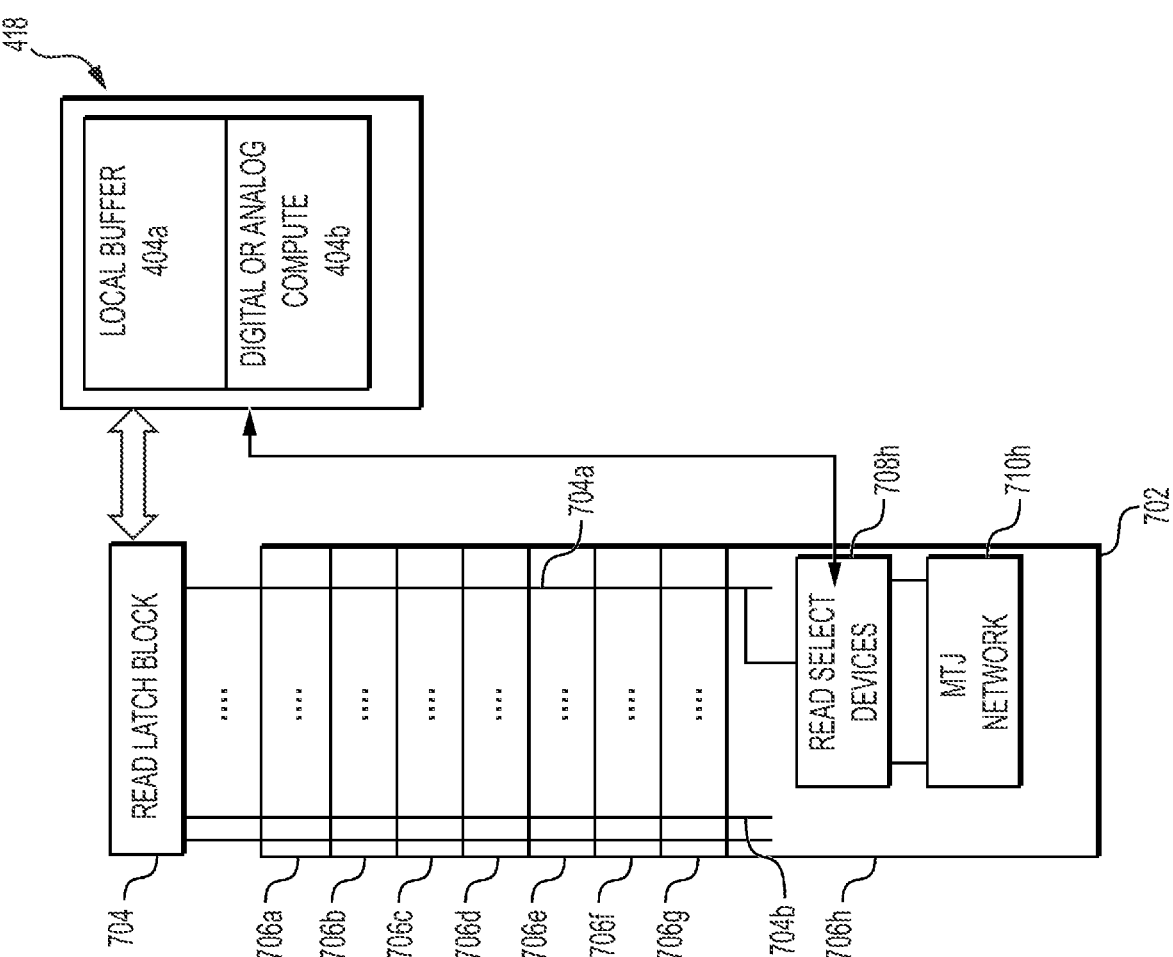
FIG. 7 depicts another exemplary embodiment of a non-volatile distributed memory and local buffer memory, according to an aspect of the present disclosure.

FIG. 7 depicts a functional diagram 700 including a non-volatile distributed memory 702. Diagram 700 also includes core 418 including local buffer 404*a* and digital or analog compute module 404*b*, as described in reference to FIGS. 2, 3 and 4. Core 418 may be electrically connected to each configuration bit cluster of configuration bits of non-volatile distributed memory 702. FIG. 7 shows core 418 electrically connected to configuration bit cluster 706*h*. However, it will be understood that core 418 may be electrically connected to all configuration bit clusters (e.g., configuration bit clusters 706*a*-706*h*) of non-volatile distributed memory 702. It will also be understood that configuration bit clusters 706*a*-706*h* are shown as an example only, and that non-volatile distributed memory 702 may include any applicable number of clusters. Further, although configuration bit clusters 706*a*-706*h* are depicted as being similar in size, it will be understood that the clusters in non-volatile distributed memory 702 may have any applicable number of configuration bits (e.g., two or more configuration bits). As discussed herein, non-volatile distributed memory 702, including the clusters included therein and the configuration bits included within the clusters, may be implemented as non-volatile memory.

Core 418 may be designed to activate a subset of configuration bit clusters of non-volatile distributed memory 702 based on a cluster mapping, as disclosed herein. For example, core 418 may activate a subset of configuration bit clusters that map to a network layer identified for performing a memory operation. As shown in FIG. 7, for example, core 418 may cause configuration bit cluster 706*h* to activate. The activation may include causing a minimum threshold voltage, as discussed herein, to be applied to read select devices 708*h* associated with a given subset of configuration bit clusters. Each cluster of non-volatile distributed memory 702 may be associated with a read select devices component and an MTJ network (e.g., as discussed in reference to FIGS. 6A-6C). For example, as shown in FIG. 7, core 418 may cause a signal to be provided to read select devices 708*h* corresponding to configuration bit cluster 706*h*. In response, read select devices 708*h* may activate MTJ network 710*h* associated with configuration bit cluster 706*h*.

Activation of a given MTJ network associated with a given configuration bit cluster may cause an operation (e.g., a read operation or a write operation), associated with the configuration bits of the given configuration bit cluster, to be performed. As discussed herein, a subset of configuration bit clusters may store network component data stored via respective configuration bit states. Accordingly, activating MTJ networks associated with one or more configuration bit clusters may cause an operation to be performed by those one or more configuration bit clusters. For example, activating MTJ network 710*h* may cause the states associated with the configuration bits of cluster 706*h* to be loaded into read latch block 704. These states may represent the network component data stored at cluster 706*h*. Further, these states may be provided to core 418 from read latch block 704.

Read latch block 704 may be designed to receive (e.g., load) network component data (e.g., configuration bit states for a given subset of clusters). In contrast to the non-volatile distributed memory 402 of FIG. 4, non-volatile distributed memory 702 may be designed to have a single read latch block 704 component. This read latch block 704 component may be designed to load network component data from a subset of configuration bit clusters that are addressed (e.g., activated) via core 418. Accordingly, non-volatile distributed memory 702 may be designed to have less electrical components than non-volatile distributed memory 402, which may be designed to have multiple read latch blocks (e.g., a read latch block associated with each cluster).

Each non-volatile distributed memory 702 cluster may have corresponding read select devices (e.g., read select devices 708h associated with cluster 706h). Read select devices may effectively operate as switches which cause a connected MTJ network to change from a power off state to a power on state and/or to perform an operation. Although read select devices are generally disclosed herein as corresponding to a given cluster of non-volatile distributed memory 702, it will be understood that each configuration bit or a subset of configuration bits associated with a cluster may be associated with a respective read select block. As discussed herein, core 418 may address a given subset of clusters. Core 418 may address the given subset of clusters to perform a read or write operation. Such addressing may including receiving an activation signal, at one or more clusters, from core 418. Such addressing may cause corresponding read select blocks to activate corresponding MTJ networks of the given subset of clusters. During a write operation, activating corresponding MTJ networks may cause network component data to be loaded into the configuration bits of the subset of clusters. During a read operation, activating corresponding MTJ networks to connect to one or more columns (e.g., electrical paths) which are connected to read select devices. The connection may cause network component data stored via these MTJ networks to be loaded into read latch block 704 for transmission to core 418. Accordingly, read latch block 704 may be designed to load network component data associated with a single cluster at a given time.

According to embodiments of the disclosed subject matter, local buffer 118 may be replaced by a multiplexer (Mux) circuit that outputs network component data (e.g., groups of bit values) from subset of a plurality of configuration bit clusters of a non-volatile distributed memory (e.g., non-volatile distributed memory 402 or non-volatile distributed memory 702 as discussed herein). For such embodiments, an identified subset of a plurality of configuration bit clusters of a non-volatile distributed memory may remain in a power-on state during a read operation. Additionally, for such embodiments, an identified subset of a plurality of configuration bit clusters of a non-volatile distributed memory may be activated to be in a power-on state to perform a write operation and may be deactivated (e.g., powered off) after completion of the write operation. It will be understood that although the embodiments disclosed herein are generally directed to networks (e.g., neural networks), these embodiments are also applicable to any distributed core or distributed computing implementations.

FIG. 8A depicts a flowchart 800 for an exemplary method for performing a read operation using a non-volatile distributed memory and a local buffer, as disclosed herein. At step 802 of flowchart 800, a network layer for performing a memory operation may be identified. The identified network layer may be identified based on a memory operation being performed or to be performed in association with the identified network layer.

At step 804, a subset of a plurality of configuration bit clusters of a non-volatile distributed memory (e.g., non-volatile distributed memory 402 or non-volatile distributed memory 702 as discussed herein) may be identified. The identified subset of the plurality of configuration bit clusters of a non-volatile distributed memory may be identified as being mapped to the network layer identified at step 802. As discussed herein, the identified subset of the plurality of configuration bit clusters of a non-volatile distributed memory may be clusters that store network component data associated with the network layer identified at 802.

At step 806, the subset of the plurality of configuration bit clusters of the non-volatile distributed memory identified at step 804 may be activated. These clusters may be activated from an off power state instead of an on power state or a standby power state. The activation of these clusters may be instant (e.g., under approximately 10 ns).

At step 808, network component data stored at the subset of the plurality of configuration bit clusters of the non-volatile distributed memory activated at step 806 may be loaded into a local buffer. The loading may include transmitting the network component data stored in the subset of clusters to the local buffer. At step 810, the network component data loaded at step 808 may be applied to the network layer identified at step 802. Such applying may include providing the network component data loaded into the local buffer to the identified network layer via an electrical connection.

FIG. 8B depicts a flowchart 820 for an exemplary method for performing a write operation using a non-volatile distributed memory and a local buffer, as disclosed herein. At step 822 of flowchart 820, a network layer for performing a memory operation may be identified in a manner similar to that described in reference to step 802 of flowchart 800. At step 824, a subset of a plurality of configuration bit clusters of a non-volatile distributed memory (e.g., non-volatile distributed memory 402 or non-volatile distributed memory 702 as discussed herein) may be identified in a manner similar to that described in reference to step 804 of flowchart 800.

At step 826, the subset of the plurality of configuration bit clusters of the non-volatile distributed memory identified at step 824 may be activated in a manner similar to that described in reference to step 806 of flowchart 800. At step 828, network component data may be loaded from a local buffer into the subset of the plurality of configuration bit clusters of the non-volatile distributed memory identified at step 824. The network component data may be loaded by transmitting network component data received at the local buffer (e.g., from the network layer identified at step 822) to the subset of the plurality of configuration bit clusters of the non-volatile distributed memory. At step 830, the network component data loaded at step 828 may be stored at the subset of the plurality of configuration bit clusters of the non-volatile distributed memory. The subset of the plurality of configuration bit clusters of the non-volatile distributed memory may be powered off (e.g., deactivated) such that the network component data stored at step 830 may remain stored at such clusters for subsequent reading or modifying (e.g., writing).

Accordingly, flowchart 800 and 820 provide techniques for using a local buffer and a non-volatile distributed memory. Such use may be implemented without expending any standby current as the plurality of configuration bit clusters of the non-volatile distributed memory may be activated for performance of an operation (e.g., a read or write operation) directly from an off state (e.g., in under approximately 10 ns).

Figure 9:
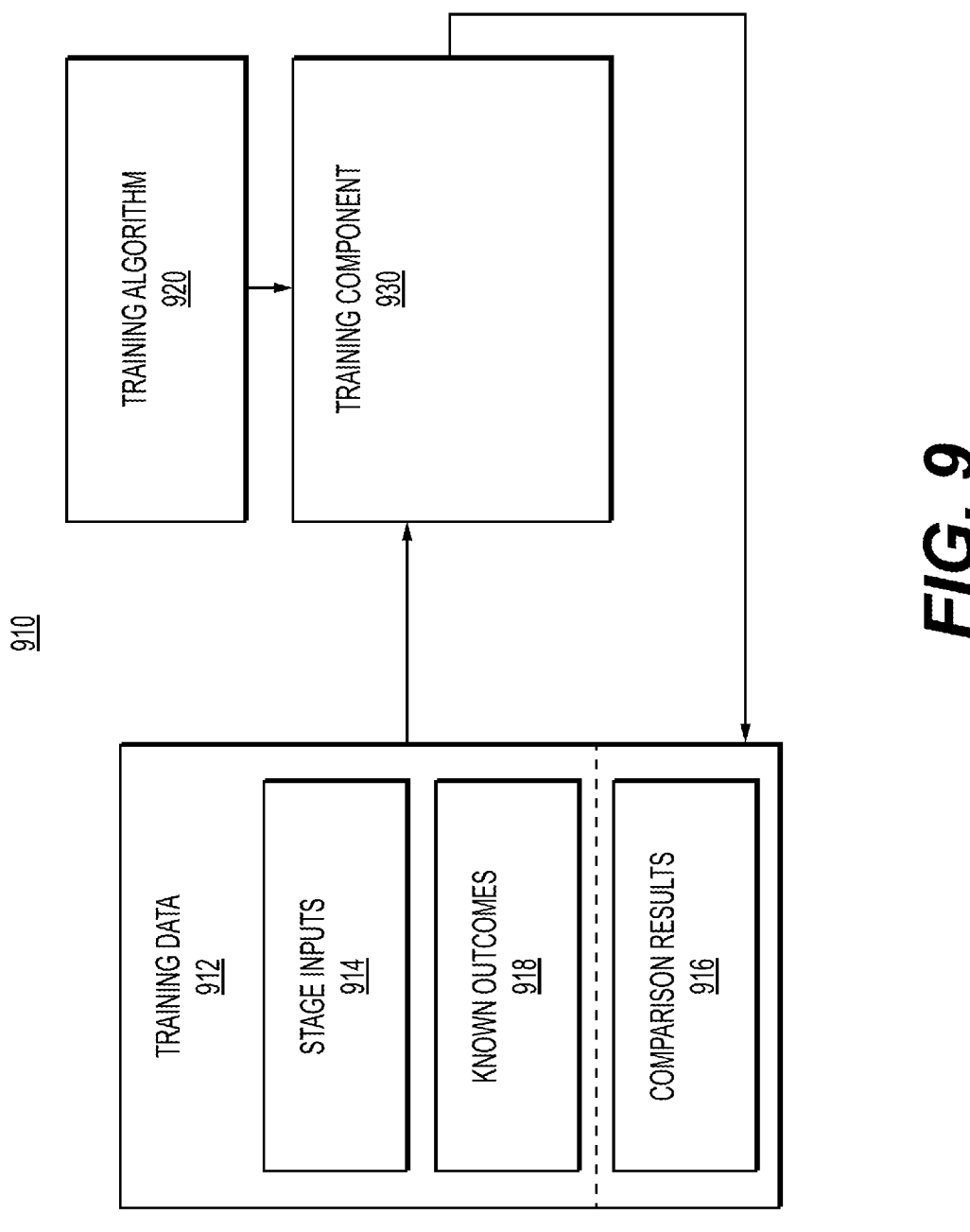
FIG. 9 depicts a flow diagram for training a machine learning model, according to an exemplary embodiment of the present disclosure.

One or more implementations disclosed herein may be applied by using a machine learning model, a neural network, or a non-AI rules-based system. For example, a trained neural network may be used to perform one or more inference operations. The neural network may be trained by updating one or more layers of the neural network and/or based on generating, updating, and/or modifying network component data associated with one or more such layers. Such training may be based on training data, for example. As shown in flow diagram 910 of FIG. 9, training data 912 may include one or more of stage inputs 919 and known outcomes 918 related to a neural network to be trained (e.g., during a learning operation). The stage inputs 919 may be from any applicable source including an input or system. The known outcomes 918 may be included for neural networks generated based on supervised or semi-supervised training. An unsupervised neural networks might not be trained using known outcomes 918. Known outcomes 918 may include known or desired outputs for future inputs similar to or in the same category as stage inputs 919 that do not have corresponding known outputs.

The training data 912 and a training algorithm 920 may be provided to a training component 930 that may apply the training data 912 to the training algorithm 920 to generate, update, or modify network component data associated with one or more layers of the neural network. According to an implementation, the training component 930 may be provided comparison results 916 that compare a previous output of the corresponding neural network to apply the previous result to re-train the neural network. The comparison results 916 may be used by the training component 930 to update network component data corresponding to layers of the neural network. The training algorithm 920 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

In general, any process or operation discussed in this disclosure that is understood to be computer-implementable, such as the flows and/or process discussed herein (e.g., in FIGS. 1-9), etc., may be performed by one or more processors of a computer system, such any systems or devices used to implement the techniques disclosed herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

While principles of the present disclosure are described herein with reference to illustrative examples for particular applications, it should be understood that the disclosure is not limited thereto. For example, instead of a MTJ-based bitcell (e.g., configuration bit), another memory bit such as resistive RAM or Ferroelectric RAM bit technology may be used to design the antifuse circuitry with the present disclosure. Another memory bit may have a programmed state and at least one unprogrammed state. The at least one unprogrammed state may further comprise a plurality of unprogrammed states, for example, a low unprogrammed state, a high unprogrammed state, and one or more intermediate unprogrammed states. Those having ordinary skill in the art and access to the teachings provided herein will recognize additional modifications, applications, embodiments, and substitution of equivalents all fall within the scope of the features described herein. Accordingly, the claimed features are not to be considered as limited by the foregoing description.

In one embodiment, the present disclosure is drawn to a method comprising: identifying a network layer for performing a memory operation, identifying a subset of a plurality of configuration bit clusters of a non-volatile distributed memory that are mapped to the identified network layer using a cluster mapping, in response to identifying the subset of the plurality of configuration bit clusters, activating the subset of the plurality of configuration bit clusters, loading network component data from the subset of the plurality of configuration bit clusters into a local buffer, and applying the network component data to the network layer for performing the memory operation.

Various aspects of the present disclosure may include one or more of the following features: the network layer is identified based on the memory operation; the cluster mapping is at least one of a mapping table, a pointer based system, or a mapping database; the subset of the plurality of configuration bit clusters are activated by applying a minimum threshold voltage to the subset of the plurality of configuration bit clusters; the subset of the plurality of configuration bit clusters are activated in under approximately 10 ns from the applying the minimum threshold voltage; the non-volatile distributed memory is one of a magnetoresistive random-access memory (MRAM) or a register memory; upon loading the network component data, deactivating the subset of the plurality of configuration bit clusters, subsequent to deactivating the subset of the plurality of configuration bit clusters, activating a second subset of the plurality of configuration bit clusters, and triggering a cluster update operation for the second subset of the plurality of configuration bit clusters, wherein the cluster update operation comprises writing updated network component data to the second subset of the plurality of configuration bit clusters, wherein the updated network component data is received from the local buffer; the subset of the plurality of configuration bit clusters store one or more of weights or biases associated with the network layer; the network layer is a neural network layer, wherein the memory operation is one of an inference operation or a training operation associated with the neural network layer; activating the subset of the plurality of configuration bit clusters comprises: receiving an activation signal at the subset of the plurality of configuration bit clusters, from the local buffer, in response to receiving the activation signal, activating read select devices associated with the subset of the plurality of configuration bit clusters, and in response to activating the read select devices, causing an MTJ network associated with a cluster of the subset of the plurality of configuration bit clusters to connect to a column connected at a read latch block of the non-volatile distributed memory, wherein loading network component data from the subset of the plurality of configuration bit clusters into the local buffer comprises: loading configuration bit states associated with the MTJ network into the read latch block, in response to the MTJ network connecting to the column connected at the read latch block, and providing the configuration bit states to the local buffer.

In another embodiment, the present disclosure is drawn to a method comprising: identifying a network layer performing a memory operation, identifying a subset of a plurality of configuration bit clusters of a non-volatile distributed memory that are mapped to the identified network layer using a cluster mapping, in response to identifying the subset of the plurality of configuration bit clusters, activating the subset of the plurality of configuration bit clusters, loading network component data from a local buffer into the subset of the plurality of configuration bit clusters, and storing the network component data at the subset of the plurality of configuration bit clusters.

Various aspects of the present disclosure may include one or more of the following features: the subset of the plurality of configuration bit clusters are activated by applying a minimum threshold voltage to the subset of the plurality of configuration bit clusters; the subset of the plurality of configuration bit clusters are activated in under approximately 10 ns from the applying the minimum threshold voltage.

In yet another embodiment, the present disclosure is drawn to a system comprising: a network comprising a plurality of network layers including a first layer identified for performing a memory operation, a local buffer in communication with a cluster mapping, and a non-volatile distributed memory comprising a plurality of configuration bit clusters, wherein the local buffer: activates a subset of the plurality of configuration bit clusters based on the cluster mapping, receives network component data from the subset of the plurality of configuration bit clusters, and provides the network component data to the first layer identified for performing the memory operation.

Various aspects of the present disclosure may include one or more of the following features: the local buffer is on a same chip as the non-volatile distributed memory; the subset of the plurality of configuration bit clusters are activated in under approximately 10 ns from an application of a minimum threshold voltage.

The foregoing description of the inventions has been described for purposes of clarity and understanding. It is not intended to limit the inventions to the precise form disclosed. Various modifications may be possible within the scope and equivalence of the application.

We claim:

1. A method comprising:
identifying a network layer for performing a memory operation;
identifying a subset of a plurality of configuration bit clusters of a non-volatile distributed memory that are mapped to the identified network layer using a cluster mapping;
in response to identifying the subset of the plurality of configuration bit clusters, activating the subset of the plurality of configuration bit clusters;
loading network component data from the subset of the plurality of configuration bit clusters into a local buffer; and
applying the network component data to the network layer for performing the memory operation.

2. The method of claim 1, wherein the network layer is identified based on the memory operation.

3. The method of claim 1, wherein the cluster mapping is at least one of a mapping table, a pointer based system, or a mapping database.

4. The method of claim 1, wherein the subset of the plurality of configuration bit clusters are activated by applying a minimum threshold voltage to the subset of the plurality of configuration bit clusters.

5. The method of claim 4, wherein the subset of the plurality of configuration bit clusters are activated in under approximately 10 ns from the applying the minimum threshold voltage.

6. The method of claim 1, wherein the non-volatile distributed memory is one of a magnetoresistive random-access memory (MRAM) or a register memory.

7. The method of claim 1, further comprising, upon loading the network component data, deactivating the subset of the plurality of configuration bit clusters.

8. The method of claim 7, further comprising:
subsequent to deactivating the subset of the plurality of configuration bit clusters, activating a second subset of the plurality of configuration bit clusters; and
triggering a cluster update operation for the second subset of the plurality of configuration bit clusters, wherein the cluster update operation comprises writing updated network component data to the second subset of the plurality of configuration bit clusters.

9. The method of claim 8, wherein the updated network component data is received from the local buffer.

10. The method of claim 1, wherein the subset of the plurality of configuration bit clusters store one or more of weights or biases associated with the network layer.

11. The method of claim 1, wherein the network layer is a neural network layer.

12. The method of claim 11, wherein the memory operation is one of an inference operation or a training operation associated with the neural network layer.

13. The method of claim 1, wherein activating the subset of the plurality of configuration bit clusters comprises:
receiving an activation signal at the subset of the plurality of configuration bit clusters, from the local buffer;
in response to receiving the activation signal, activating read select devices associated with the subset of the plurality of configuration bit clusters; and
in response to activating the read select devices, causing a magnetic tunnel junction (MTJ) network associated with a cluster of the subset of the plurality of configuration bit clusters to connect to a column connected at a read latch block of the non-volatile distributed memory.

14. The method of claim 13, wherein loading network component data from the subset of the plurality of configuration bit clusters into the local buffer comprises:
loading configuration bit states associated with the MTJ network into the read latch block, in response to the MTJ network connecting to the column connected at the read latch block; and
providing the configuration bit states to the local buffer.

15. A method comprising:
identifying a network layer performing a memory operation;
identifying a subset of a plurality of configuration bit clusters of a non-volatile distributed memory that are mapped to the identified network layer using a cluster mapping;
in response to identifying the subset of the plurality of configuration bit clusters, activating the subset of the plurality of configuration bit clusters;
loading network component data from a local buffer into the subset of the plurality of configuration bit clusters; and storing the network component data at the subset of the plurality of configuration bit clusters.

16. The method of claim 15, wherein the subset of the plurality of configuration bit clusters are activated by applying a minimum threshold voltage to the subset of the plurality of configuration bit clusters.

17. The method of claim 16, wherein the subset of the plurality of configuration bit clusters are activated in under approximately 10 ns from the applying the minimum threshold voltage.

18. A system, comprising:

a network comprising a plurality of network layers including a first layer identified for performing a memory operation;

a local buffer in communication with a cluster mapping; and a non-volatile distributed memory comprising a plurality of configuration bit clusters, wherein the local buffer:

activates a subset of the plurality of configuration bit clusters based on the cluster mapping;

receives network component data from the subset of the plurality of configuration bit clusters; and provides the network component data to the first layer identified for performing the memory operation.

19. The system of claim 18, wherein the local buffer is on a same chip as the non-volatile distributed memory.

20. The system of claim 18, wherein the subset of the plurality of configuration bit clusters are activated in under approximately 10 ns from an application of a minimum threshold voltage.

\* \* \* \* \*